Dec. 1, 1925. 1,563,365
C. H. HOLLUP
MACHINE FOR COATING ARC WELDING ELECTRODES
Filed July 9, 1920  5 Sheets-Sheet 1

Dec. 1, 1925.

C. H. HOLLUP 1,563,365

MACHINE FOR COATING ARC WELDING ELECTRODES

Filed July 9, 1920 5 Sheets-Sheet 2

Inventor:
Charles H. Hollup
By Sheridan, Jones, Sheridan & Smith
attys.

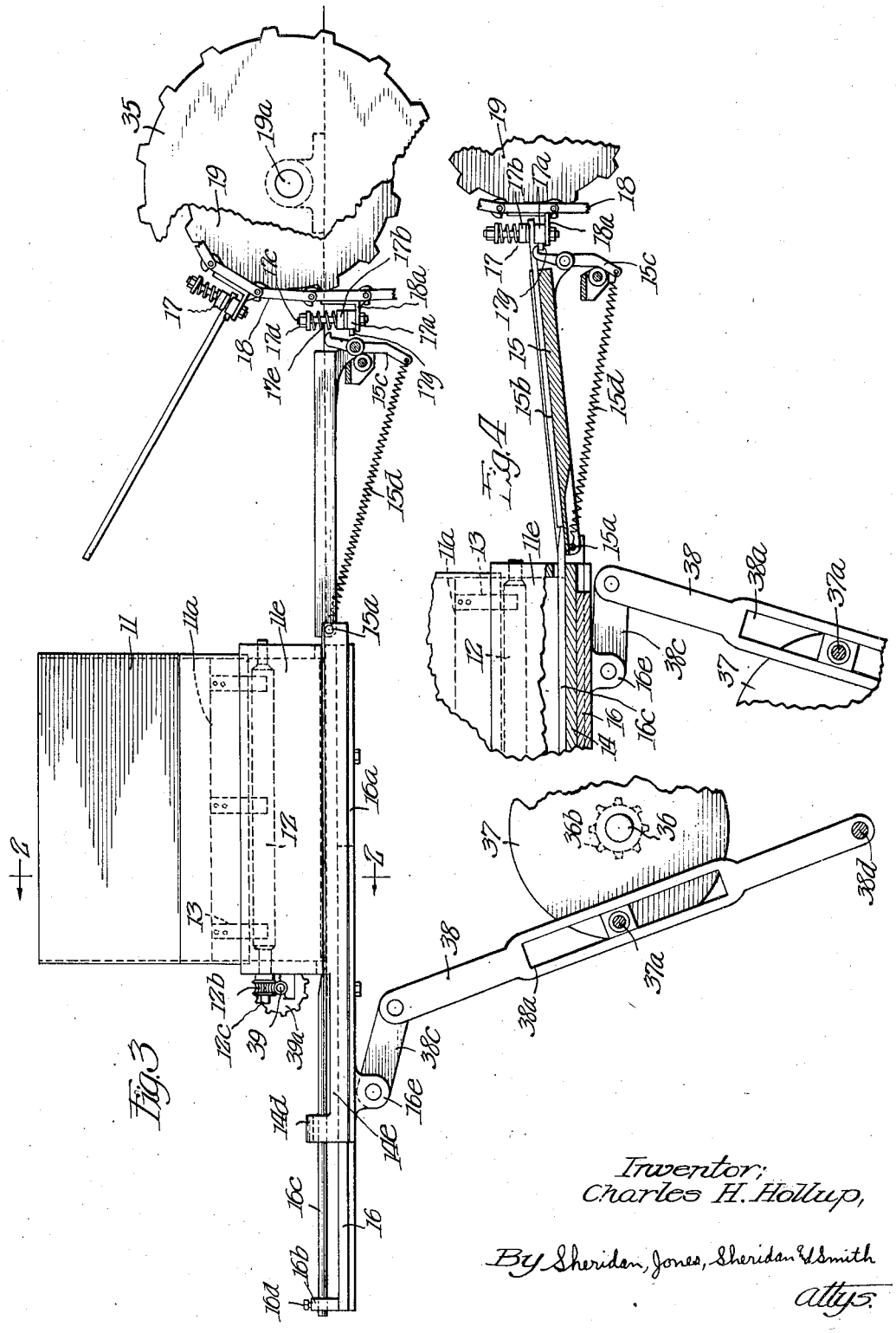

Dec. 1, 1925.
C. H. HOLLUP
1,563,365
MACHINE FOR COATING ARC WELDING ELECTRODES
Filed July 9, 1920     5 Sheets-Sheet 4
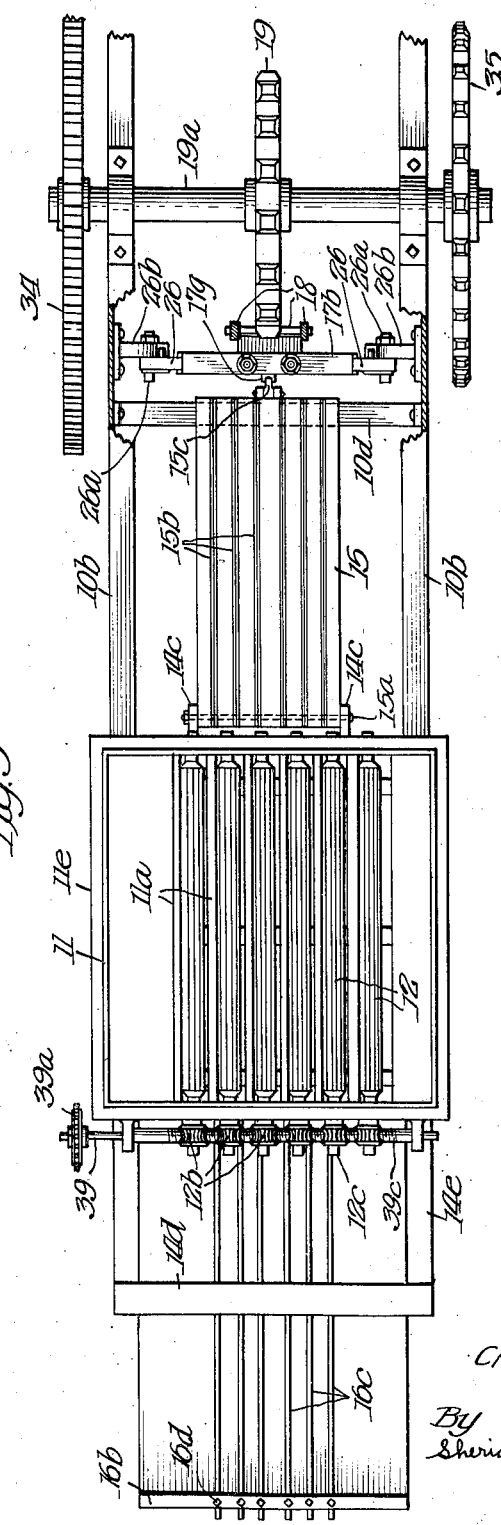
Inventor,
Charles H. Hollup,
By
Sheridan, Jones, Sheridan & Smith
Attys.

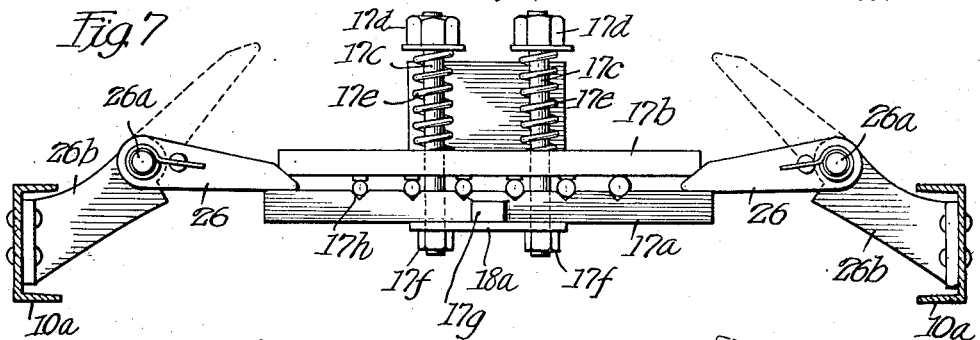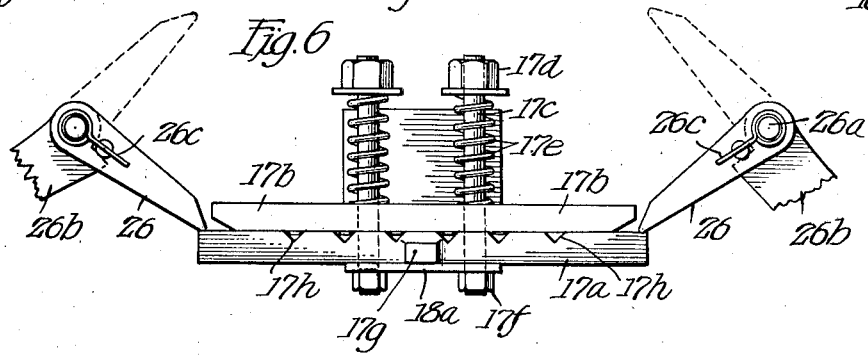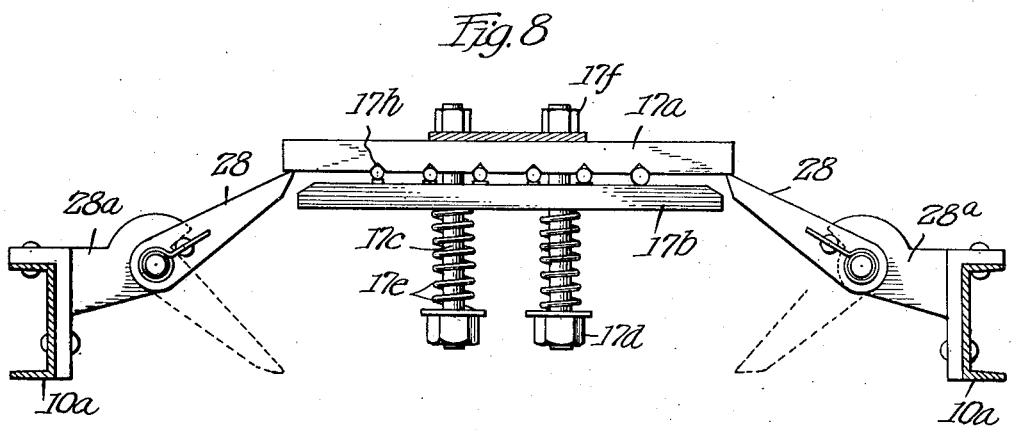

Patented Dec. 1, 1925.

1,563,365

UNITED STATES PATENT OFFICE.

CHARLES H. HOLLUP, OF MILWAUKEE, WISCONSIN, ASSIGNOR TO C. H. HOLLUP CORPORATION, A CORPORATION OF ILLINOIS.

MACHINE FOR COATING ARC-WELDING ELECTRODES.

Application filed July 9, 1920. Serial No. 394,931.

*To all whom it may concern:*

Be it known that I, CHARLES H. HOLLUP, a citizen of the United States, residing at Milwaukee, in the county of Milwaukee and State of Wisconsin, have invented certain new and useful Improvements in Machines for Coating Arc-Welding Electrodes, of which the following is a specification.

This invention relates to improvements in coating and drying apparatus, and more particularly to apparatus of this character which shall be primarily adapted for use in coating and drying arc welding electrodes.

In my co-pending applications, Serial Nos. 209,392 and 352,582, I have described various compounds for coating welding electrodes, which compounds, when applied to these electrodes, serve to enhance the welding operation and to improve the resultant weld rendering the same more homogeneous and ductile as compared with the welds produced with the so-called "bare metal" electrodes. It has been found very desirable, in practice, that these coatings, which are preferably applied by dipping the electrodes into a solution containing the desired compound, be of uniform thickness and evenly distributed over the surfaces of the electrodes. It is with these objects in view that the present apparatus has been designed.

One object of the invention is to provide an apparatus of the character described which shall be adapted to automatically feed bare metal electrodes from a hopper or other suitable container to a conveyer adapted to grip said electrodes and to thereafter cause the same to pass through a coating bath, after which the said electrodes are maneuvered by means of said conveyer in suchwise as to simultaneously dry the same and effect an even and uniform distribution of the coating film over the surfaces thereof, said electrodes being then automatically dis charged from the apparatus at some convenient point where they may be packed or otherwise prepared for shipment.

Other objects and advantages of the invention will be apparent from the following description taken in connection with the accompanying drawings wherein one form of the invention is illustrated.

Fig. 3 is a side elevation of the feed hopper and associated mechanism, a portion of the endless conveyer being also shown in order to illustrate its position relatively to said hopper mechanism;

Fig. 4 is a detail fragmentary view similar to Fig. 3, but showing certain of the parts in section and in feeding position;

Fig. 5 is a top plan view of the hopper and associated mechanism, a portion of the endless conveyer being also shown in this figure;

Figs. 6 and 7 are detail views of one of the electrode gripping elements and their operating devices, Fig. 6 showing the jaws of this element about to be separated for receiving a plurality of the electrodes, while Fig. 7 shows the jaws separated, and the electrodes positioned therebetween, and, Fig. 8 is a view similar to Figs. 6 and 7, but showing the gripping device in position for discharging the electrodes therefrom, the operating devices for effecting this discharge being also shown in this illustration.

Referring more in detail to the drawings, the machine is shown as comprising a supporting frame-work 10 made up of vertical, horizontal, and diagonal structural elements $10^a$, $10^b$, and $10^c$, respectively. Mounted across the uppermost horizontal members $10^b$ of this supporting frame-work is a hopper 11 into which the electrodes to be coated are placed. As is well known, these electrodes are ordinarily in the form of small rods or small sections of wire ranging from about one-eighth inch in diameter to one-fourth inch or slightly over. These rods may vary in length although, at present, their averag< is approximately fourteen inches.

The hopper 11 is divided longitudinal into a plurality of compartments by means of the partitions $11^a$, and said hopper is further divided by a series of partitions $11^b$, located beneath the partitions $11^a$, into a plurality of chutes $11^c$, there being one of these latter located beneath each of the compartments formed by the partitions $11^a$.

Figure 2:
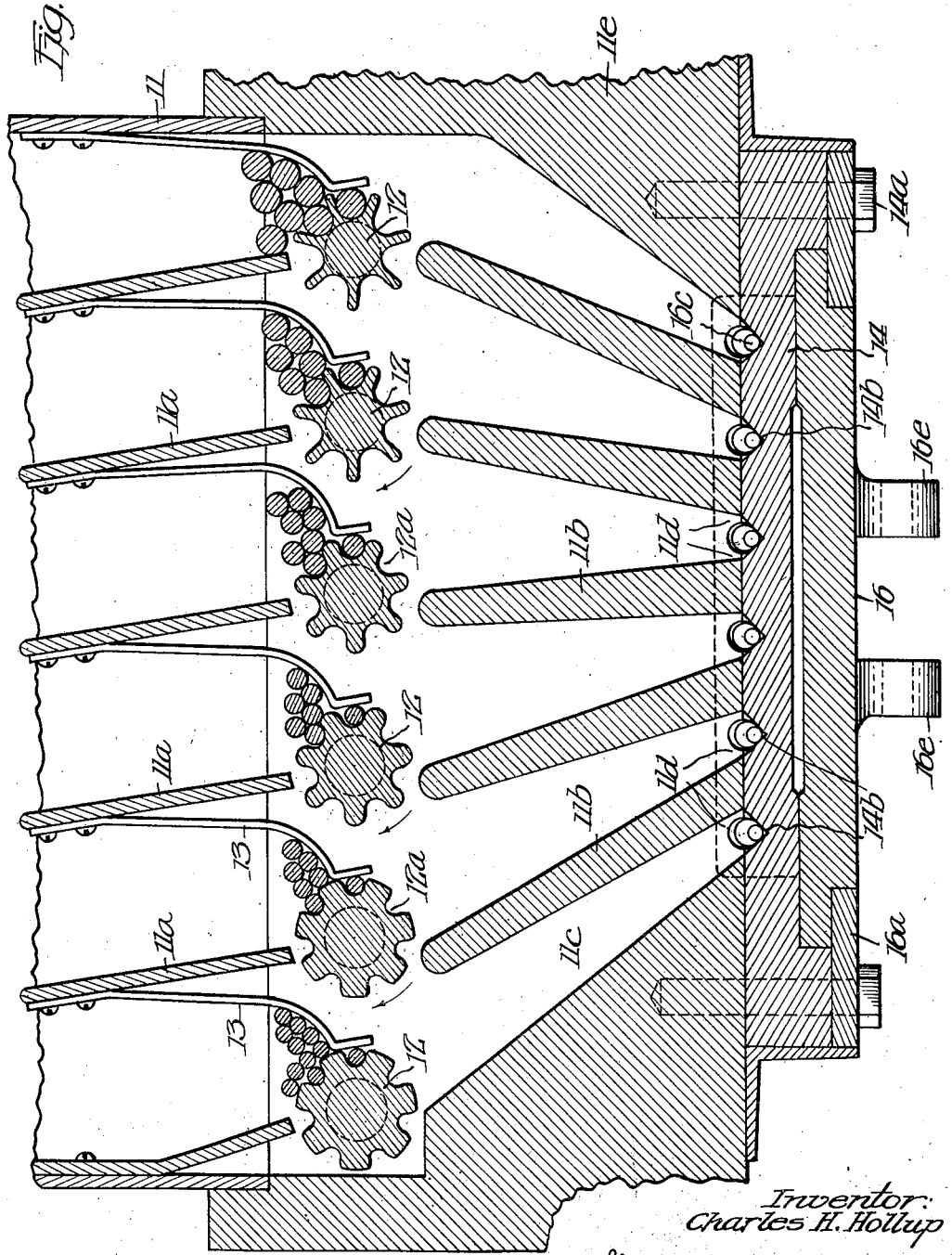
Fig. 2 is a vertical transverse sectional view taken through the feed hopper of the apparatus.

Each of the chutes 11ᶜ is provided with an outlet 11ᵈ formed in the bottom of the hopper. Interposed between the compartments formed by the partitions 11ᵃ, and chutes 11ᶜ, are a series of feeding rollers 12, there being one of these rollers for each of said compartments, the hopper herein illustrated being shown provided with six, although, as will be readily appreciated, these hoppers may be provided with any number of rollers as may prove desirable. Each of these rollers 12 is provided with a plurality of longitudinal grooves 12ᵃ of such size as to receive only one electrode at a time, spring fingers 13 being provided and cooperating with the rollers 12 to prevent the feeding or passage of electrodes from the compartments except as effected by means of the feed rollers, which latter, as above pointed out, are so designed as to feed these electrodes one at a time. The structure, just described, is illustrated more clearly in Fig. 2 of the drawings, a plurality of electrodes being shown in each of the compartments of the hopper in this figure and in the process of being fed from the compartments into the corresponding chutes therebeneath. In this figure, as will be also observed, the electrodes in each of the six compartments of the hopper are of slightly different diameters, those of the smallest diameter being positioned in the first compartment to the left, the electrodes in the other compartments gradually increasing in diameter. Where electrodes of various sizes are fed through the hopper, as illustrated in Fig. 2, the size of the grooves in the feed rollers must obviously be varied, as shown in the drawings, in order to insure the desired feed. In order to simplify the construction of the hopper and the assembly of its various parts, the portion thereof containing the various compartments provided by the partitions 11ᵃ is separate from the lower part 11ᵉ of the hopper, in which latter part, as will be observed, the various feed rollers are journalled and the partitions 11ᵇ provided, which form the chutes 11ᶜ, previously described.

Secured against the bottom of the hopper 11 by means of suitable bolts 14ᵃ or other fastening means is a stationary plate or table 14. This plate extends preferably from end to end of the hopper and is provided on its upper face with a plurality of V-shaped grooves 14ᵇ which extend throughout the length of the plate and which coincide or register with the various outlets 11ᵈ in the bottom of the hopper. This plate at its forward end, is provided with a plurality of flanges 14ᶜ designed to pivotally receive the ends of the elongated pin or bolt 15ᵃ of the transfer table 15, the forward end of which table being free but normally supported upon the transverse element 10ᵈ of the framework 10. Transfer table 15 is also grooved longitudinally from end to end as at 15ᵇ, these grooves being in direct alinement with those provided in the upper face of the stationary plate or table 14.

Slidably mounted against the under face of the stationary plate 14 and supported in position by means of the longitudinally extending strips 16ᵃ is a third plate or table 16 which carries an apertured cross-bar 16ᵇ at its outer end adapted to receive the outer ends of a plurality of push rods 16ᶜ, the cross-bar 16ᵇ being provided with a plurality of bolts or other clamping devices 16ᵈ by means of which the ends of said push rods may be firmly held, as shown more particularly in Figs. 3 and 5 of the drawings. These push rods 16ᶜ are supported and guided, intermediate their ends by means of the apertured cross-bar 14ᵈ, which latter spans the ends of the rearwardly projecting side strips 14ᵉ of the stationary plate 14. These push rods 16ᶜ are also in direct alinement with the grooves in the upper face of the stationary plate 14 and are adapted, upon reciprocation of their supporting plate or table 16, in the manner to be described hereinafter, to move back and forth, each within its respective groove 14ᵇ and thus to feed the electrodes as the same are deposited upon the stationary plate 14, over the transfer table 15, and into engagement with the gripping devices 17 carried by the endless conveyer 18.

The endless conveyer 18 is in the form of a chain which is caused to travel on a circuitous path by the sprocket wheels 19, 20, 21, 22, 23, 24, and 25, over which said chain travels. These sprocket wheels just named are carried on transverse shafts 19ᵃ, 20ᵃ, 21ᵃ, 22ᵃ, 23ᵃ, 24ᵃ, and 25ᵃ, respectively, which shafts are journaled in suitable manner to the frame-work of the apparatus. The gripping or clamping devices 17 are carried at intervals throughout the length of this chain and are supported thereon by means of the brackets 18ᵃ which latter may be formed integral with the links of the chain 18 or rigidly attached thereto in some other suitable manner. Each of these clamping devices comprises a pair of jaws 17ᵃ and 17ᵇ, the upper jaw 17ᵇ being movable with respect to the lower jaw 17ᵃ which is preferably stationary and supported directly upon the outstanding flange of the supporting bracket 18ᵃ. A plurality of bolts 17ᶜ extend through the outstanding flange of the bracket 18ᵃ and upwardly through both of the jaws 17ᵃ and 17ᵇ, these bolts terminating in headed members 17ᵈ at their upper ends, between which members and the upper face of the movable jaw 17ᵇ coil springs 17ᵉ surrounding the bolts 17ᶜ are provided. The lower ends of these bolts 17ᶜ are also provided with headed members in the form of nuts 17ᶠ below the outstanding plate or flange of the bracket 18ª, these latter heads serving to limit the upward movement of the bolts.

The free or outer end of the transfer table 15, previously described, terminates in rather close proximity to the endless chain 18 at the point where the latter enters or begins to track the sprocket wheel 19, as shown more clearly in Figs. 3 and 4 of the drawings. Thus, the gripping devices which, as already pointed out, are supported away from the chain 18 by means of their supporting brackets 18ª pass, at this point, where the said chain begins to track this sprocket wheel 19 immediately adjacent the end of the transfer table 15. The lower stationary jaw 17ª of each clamping device 17 is slightly longer than the movable jaw 17ᵇ so that the outer ends of the stationary jaw project slightly beyond the corresponding ends of the movable jaw, as shown more clearly in Figs. 6 to 8, inclusive. The spring pressed pivoted wedging elements 26, which are normally in the position illustrated in Fig. 6, are engaged by the projecting ends of the stationary jaw 17ª of each gripping device at the point where the chain begins to track its sprocket wheel 19, these wedging elements being raised by the continued upward movement of the gripping device and thus wedge or raise the upper jaw to a position substantially as shown in Fig. 7. When the jaws have thus been separated, the ends of a set of electrodes are thrust between the same by means of the push rods 16ᶜ, the continued upward movement of the conveyer chain serving to pass the gripping device free of the wedging elements whereupon the upper jaw thereof is released and, by means of the coil springs 17ᵉ, is clamped down firmly upon said electrodes so that the latter are securely held thereby. Upon the release of the wedging elements 26, it will be observed that they are returned to normal position by means of the springs 26ᶜ. The forward or free end of the transfer table 15 is provided with a pivoted hook 15ᶜ which is normally held in the position shown in Fig. 3 by means of the coil spring 15ᵈ, and during the electrode gripping operation just described, the said transfer table 15 is raised on its pivot 15ª by means of the lug 17ᵍ of the clamping device 17 coming into engagement with the hook 15ᶜ. The arrangement is preferably such that during this lifting of the outer end of the table 15, the grooves 15ᵇ therein are in direct alinement with the grooves 17ʰ provided in the upper face of the lower stationary jaw 17ª of said device in order to facilitate the gripping operation and to insure against displacement of the electrodes as the latter are fed forwardly to position the same between the clamping jaws thereof. The engagement between the lug 17ᵍ and the hook 15ᶜ is also preferably such that the hook is released immediately upon the completion of the gripping operation, thus permitting the transfer table to return to normal and in proper position for the gripping of the next set of electrodes.

Figure 1:
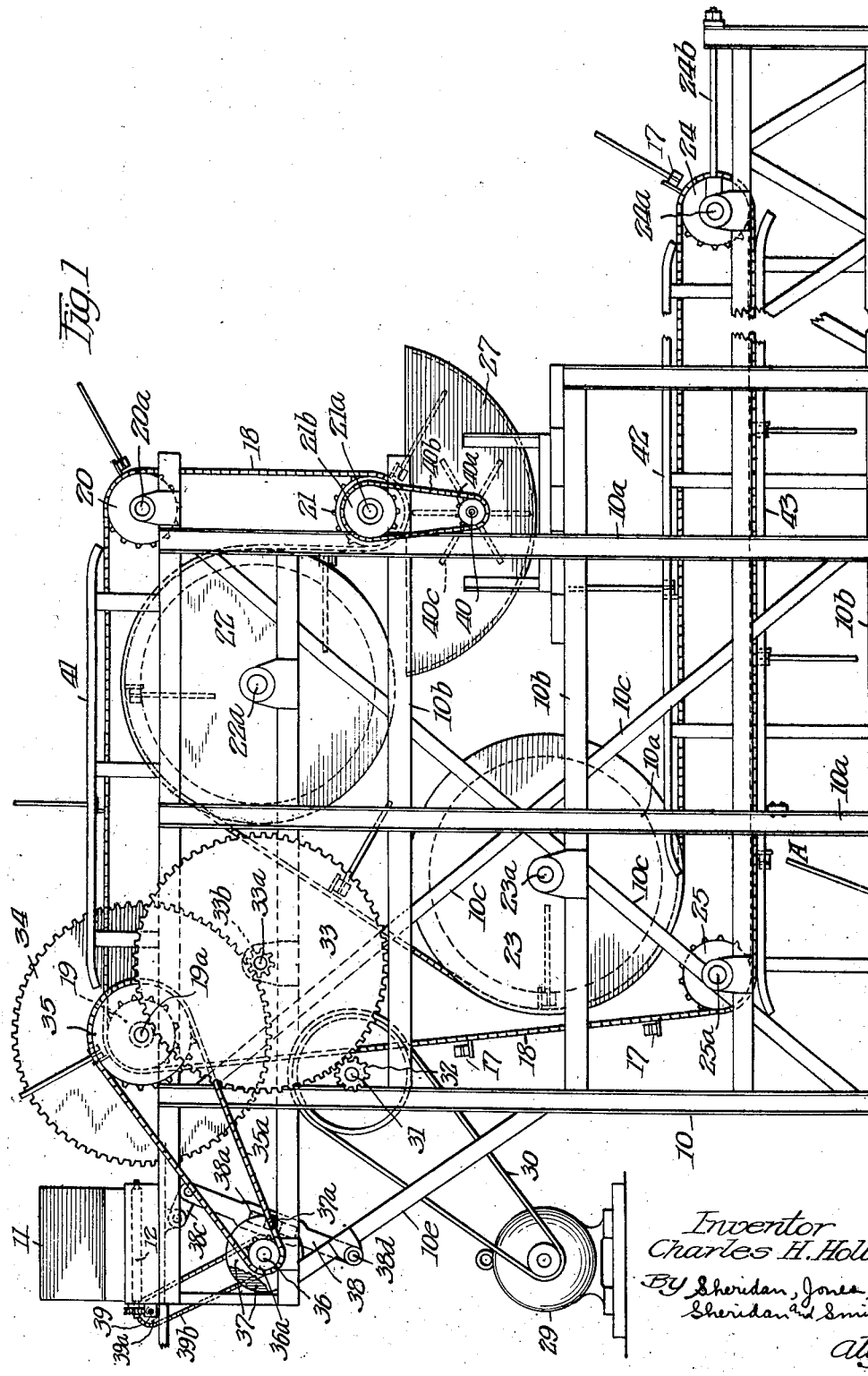
Fig. 1 is a side elevation of a machine constructed in accordance with the present invention.

Each set of electrodes, after being gripped, pass upwardly over the sprocket wheel 19 and are then carried in an upright position to the far end of the apparatus, then downwardly over sprocket wheels 20 and 21 and through the coating bath which is contained within the tank or vessel 27 which latter, as will be observed from Fig. 1 of the drawings, is supported immediately beneath the sprocket wheel 21 just named. After passing through the coating solution contained in the vessel 27, the electrodes pass upwardly supported in a horizontal position, then over the large sprocket wheel 22 in an inverted position, thence downwardly in an inclined direction and over a second large sprocket wheel 23, and then in a vertical position outwardly and over the sprocket wheel 24, which latter serves to again invert the position of the electrodes, in which position they travel to the point A where they are discharged. At this point A, another set of pivoted wedging elements 28 is provided, these elements being supported at the outer ends of suitable brackets 28ª which latter are secured to a pair of the upright frame members 10ª. These wedging elements 28 are substantially the same in construction as the elements 26 previously described, the said elements 28, however, serving to wedge the jaws of the gripping devices apart in order to release the electrodes as distinguished from the spreading and gripping operation accomplished by the elements 26. From the point where the electrodes are released, the conveyer passes over the sprocket wheel 25 and upwardly to sprocket wheel 19 in order to reposition the various gripping devices for receiving other sets of electrodes to be coated.

All of the various operating mechanisms of the apparatus are driven from a single source of power shown in the drawings, in the form of an electric motor 29 in the following manner. The motor 29, by means of the belt 30, drives the transverse shaft 31, said belt engaging suitable pulleys provided on the motor shaft and the shaft 31, respectively. This transverse shaft is provided with a small toothed pinion 32 which meshes with the large gear wheel 33 carried by the transverse shaft 33ª. A small pinion 33ᵇ is also carried by this shaft 33ª and meshes with a second large gear wheel 34, the latter being carried by the transverse shaft 19ª previously described. Through this train of reduction gearing just described, the shaft 19ª is driven and in turn drives the endless conveyer 18 through the medium of the sprocket wheel 19. A second sprocket wheel 35 is also carried by the shaft 19ª, this sprocket wheel 35 being utilized to drive the transverse shaft 36 through the medium of the sprocket chain 35ª and the sprocket 36ª carried by said shaft 36. Also carried by this shaft 36 is a disc 37 provided on one of its faces and near its periphery with a crank pin 37ª, the latter being designed to engage within the slot 38ª of the lever 38. This lever 38 is pivotally anchored at its lower end as at 38ᵈ to the frame member 10ᵉ of the apparatus and at its upper end is connected through the link 38ᶜ to the depending lugs 16ᵉ carried on the under face of the slidable plate or table 16. In this manner, as will be observed, upon rotation of the disc 37, the lever 38, through its pin and slot connection with said disc, will be oscillated in suchwise as to reciprocate the said plate 16 which latter, as previously pointed out, carries the push rods 16ᶜ. The transverse shaft 39, mounted adjacent one end of the hopper 11, is also driven from the shaft 36 by means of the sprocket wheels 39ª and 36ᵇ carried by these shafts respectively, and the sprocket chain 39ᵇ which tracks these two sprockets. The shaft 39 is provided with a worm 39ᶜ, which latter meshes with the worm wheels 12ᵇ, one of which is carried by each of the protruding ends 12ᶜ of the journals of the rollers 12. In this manner, as will be observed these various rollers 12 within the hopper will be rotated upon operation of the apparatus to feed the electrodes from the several compartments of said hopper into their respective chutes from which they are discharged, as above described, into the longitudinal grooves 14ᵇ provided in the upper face of the stationary plate 14.

The transverse shaft 21ª which carries the sprocket wheel 21 also carries a sprocket wheel 21ᵇ through which latter the shaft 40 is driven by means of the sprocket wheel 40ª carried thereby and the chain 40ᵇ which tracks said sprocket wheels 40ª and 21ᵇ. This shaft 40 is preferably supported in some suitable manner within the vessel 27 and is provided with an agitating element 40ᶜ which may be of any desired construction. Should it be desired, two or more of these agitating elements may be provided within the vessel 27 and geared to the shaft 21ª in suchwise as to rotate in opposite directions. As will be readily appreciated, these agitating elements serve to thoroughly stir the coating solution and to maintain the same of uniform density at all times during the operation of the apparatus. The transverse shaft 24ª is provided with an adjustment 24ᵇ by means of which the tension of the endless conveyer 18 may be regulated. If desired, the guiding elements, such as shown at 41, 42, and 43, may be provided for the conveyer chain at the points where the latter travels in a substantially horizontal direction. These guiding elements, as shown in the drawings, are in pairs, one provided on each side of the conveyer and in position to be engaged by the opposite ends of the gripping elements. In this manner, accidental displacement of the conveyer chain from its sprocket wheels is avoided.

In the operation of the apparatus, bare metal electrodes, cut to the desired length, are placed in the various compartments of the hopper 11 the rollers 12, operated as above described, serving to each feed these electrodes one at a time into their respective chutes from which they are deposited in the grooves provided in the upper face of the stationary plate 14. When one set of the electrodes have thus been positioned on the plate 14, the slidable plate 16 is then moved forward by its operating mechanism, the push rods 16ᶜ thereof engaging the adjacent ends of the electrodes and forcing the same into the grooves 15ᵇ of the transfer table 15. While this latter operation is being effected, the movable jaws of one of the gripping devices carried by the endless conveyer are being separated by the dogs or wedging elements 26 so as to receive the outer ends of the electrodes, as shown in Fig. 4, when the push rods have reached their outer limit of travel. Simultaneously, with this operation, the outer end of the transfer table is raised, as above described, so as to maintain the grooves 15ᵇ thereof in alinement with the grooves 17ʰ of the lower jaw of the receiving gripping device until after the ends of the electrodes have been received between the gripping jaws. As soon as the outer ends of the electrodes have been received by the gripping device, the travel of the conveyer serves to remove the dogs or wedging elements 26, whereupon the upper jaw is clamped down upon the electrodes, the latter being then supported, as shown in the drawings, at substantially right angles to the path of travel of the conveyer. When the various sets of electrodes supported by the conveyer, as just described, reach the sprocket wheel 21, they are caused to pass through the coating fluid contained in the vessel 27 after which they are carried by the conveyer in various positions, as above described, in order that the coating will be evenly and uniformly distributed over the surfaces of said electrodes, the conveyer being preferably operated at a sufficiently slow speed during this maneuvering of the electrodes so that the latter will be thoroughly dry by the time they reach the discharging station A.

It will be obvious to those skilled in the art that the present improvements are susceptible of various changes and modifications without departing from the spirit of the invention and accordingly it is not desired to limit the same to the particular construction and arrangement of parts herein illustrated except where limitations appear in the appended claims.

I claim—

1. In apparatus of the class described, a hopper adapted to receive a plurality of elongated articles of substantially the same shape, said hopper being provided with a plurality of outlets, a stationary plate beneath said hopper provided with a groove corresponding to each of said outlets, means for feeding said articles through said outlets and into said grooves, an endless conveyer, gripping means carried thereby, a transfer table provided with longitudinal grooves in alinement with the grooves of said stationary plate, said table being pivotally mounted at one end adjacent said stationary plate and terminating at its other end adjacent said conveyer, a movable element, and push rods carried thereby adapted to enter the grooves of said stationary plate upon movement of said element in one direction to thereby push said articles from the grooves of said stationary plate into the grooves of said transfer table to a position to be received by said gripping means.

2. In combination, an endless conveyer, movable gripping jaws carried thereby, a hopper adjacent said conveyer adapted to receive articles to be operated upon, a stationary element, means for feeding said articles from said hopper onto said element, a transfer table mounted between said element and said conveyer, means for moving said articles from said element over said table in the direction of said conveyer, and means for simultaneously separating said gripping jaws in suchwise that said articles may be received therebetween during the movement thereof by said means.

3. In combination, an endless conveyer, movable gripping jaws carried thereby, a hopper adjacent said conveyer adapted to receive articles to be operated upon, a stationary element, means for feeding said articles from said hopper onto said element, a transfer table pivotally mounted between said element and said conveyer, means for moving said articles from said element over said table in the direction of said conveyer, means for simultaneously separating said gripping jaws in suchwise that said articles may be received therebetween during the movement thereof by said means, and means for raising said transfer table on its pivot during the last-named feeding and clamping operations in suchwise as to cause the same to follow said clamping jaws until after said articles have been received therebetween.

4. In combination, a hopper having an outlet therein, means adjacent said outlet for receiving articles issuing therefrom, an endless conveyor, gripping means carried thereby, and means for moving said articles from said receiving means to said gripping means, said gripping means comprising two relatively movable members, spring means normally urging them together, and means associated with said receiving means for temporarily separating said members so that said articles may be received therebetween and held thereby.

5. In combination, an endless conveyor, spaced apart brackets carried thereby, each bracket having attached thereto a fixed and a movable gripping member, spring means normally urging said members together, means for momentarily separating said members, and means for moving a charge therebetween upon separation of said members.

6. In combination, an endless conveyor, movable gripping jaws carried thereby, a hopper adjacent said conveyor adapted to receive articles to be operated upon, an element for receiving articles from said hopper, means for moving said articles from said element towards said conveyor, and means for simultaneously operating said gripping jaws in suchwise that said articles may be received therebetween during movement thereof by said means.

In testimony whereof, I have subscribed my name.

CHARLES H. HOLLUP.